US012516267B2

(12) United States Patent
Jonasson et al.

(10) Patent No.: US 12,516,267 B2
(45) Date of Patent: *Jan. 6, 2026

(54) WAX COMPOSITIONS FOR USE IN CANDLES AND METHODS OF PREPARING WAX COMPOSITIONS

(71) Applicant: AAK AB (PUBL), Malmo (SE)

(72) Inventors: Sievert Jonasson, Trensum (SE); Krister Hed, Karlshamn (SE); Staffan Norberg, Karlshamn (SE)

(73) Assignee: AAK AB (PUBL), Malmo (SE)

( * ) Notice: Subject to any disclaimer, the term of this patent is extended or adjusted under 35 U.S.C. 154(b) by 0 days.

This patent is subject to a terminal disclaimer.

(21) Appl. No.: 19/185,829

(22) Filed: Apr. 22, 2025

(65) Prior Publication Data

US 2025/0250505 A1    Aug. 7, 2025

Related U.S. Application Data

(63) Continuation of application No. 17/757,042, filed as application No. PCT/SE2020/051170 on Dec. 4, 2020, now Pat. No. 12,305,145.

(30) Foreign Application Priority Data

Dec. 9, 2019    (SE) .................................... 1951416-5

(51) Int. Cl.
*C11C 5/00*    (2006.01)
*C11C 3/10*    (2006.01)

(52) U.S. Cl.
CPC ................ *C11C 5/002* (2013.01); *C11C 3/10* (2013.01)

(58) Field of Classification Search
CPC .............. C11C 3/10; C11C 5/00; C11C 5/002
See application file for complete search history.

(56) References Cited

U.S. PATENT DOCUMENTS

| | | |
|---|---|---|
| 605,436 A | 6/1898 | Kellogg |
| 642,748 A | 2/1900 | Manners |
| 658,436 A | 9/1900 | Groth |
| 746,749 A | 12/1903 | Seidel |
| 794,641 A | 7/1905 | Ramey |
| 902,832 A | 11/1908 | Philbrook |
| 5,797,392 A | 8/1998 | Keldmann et al. |
| 6,648,848 B1 | 11/2003 | Keldmann et al. |
| 6,715,485 B1 | 4/2004 | Djupesland |
| 6,773,469 B2 | 8/2004 | Murphy |
| 6,852,140 B1 | 2/2005 | Roeske |
| D530,815 S | 10/2006 | Murphy et al. |
| 7,128,766 B2 | 10/2006 | Murphy et al. |
| 7,347,201 B2 | 3/2008 | Djupesland |
| 7,377,901 B2 | 5/2008 | Djupesland et al. |
| 7,481,218 B2 | 1/2009 | Djupesland |
| 7,543,581 B2 | 6/2009 | Djupesland |
| 7,740,014 B2 | 6/2010 | Djupesland |
| 7,784,460 B2 | 8/2010 | Djupesland et al. |
| 7,841,337 B2 | 11/2010 | Djupesland |
| 7,854,227 B2 | 12/2010 | Djupesland |
| 7,934,503 B2 | 5/2011 | Djupesland et al. |
| 7,975,690 B2 | 7/2011 | Djupesland |
| 8,047,202 B2 | 11/2011 | Djupesland |
| 8,146,589 B2 | 4/2012 | Djupesland |
| 8,171,929 B2 | 5/2012 | Djupesland et al. |
| 8,327,844 B2 | 12/2012 | Djupesland |
| 8,511,303 B2 | 8/2013 | Djupesland |
| 8,522,778 B2 | 9/2013 | Djupesland |
| 8,550,073 B2 | 10/2013 | Djupesland |
| 8,555,877 B2 | 10/2013 | Djupesland |
| 8,555,878 B2 | 10/2013 | Djupesland |
| 8,590,530 B2 | 11/2013 | Djupesland et al. |
| 8,596,278 B2 | 12/2013 | Djupesland |
| 8,800,555 B2 | 8/2014 | Djupesland |
| 8,875,704 B2 | 11/2014 | Djupesland et al. |
| 8,899,229 B2 | 12/2014 | Djupesland et al. |
| 8,910,629 B2 | 12/2014 | Djupesland et al. |
| D723,156 S | 2/2015 | Djupesland et al. |
| D725,769 S | 3/2015 | Djupesland et al. |
| 8,978,647 B2 | 3/2015 | Djupesland et al. |
| 9,010,325 B2 | 4/2015 | Djupesland et al. |
| 9,038,630 B2 | 5/2015 | Djupesland et al. |
| 9,067,034 B2 | 6/2015 | Djupesland et al. |
| 9,072,857 B2 | 7/2015 | Djupesland |
| 9,108,015 B2 | 8/2015 | Djupesland |
| 9,119,932 B2 | 9/2015 | Djupesland |

(Continued)

FOREIGN PATENT DOCUMENTS

| | | |
|---|---|---|
| CN | 104312736 A | 1/2015 |
| EP | 0 196 780 A2 | 10/1986 |

(Continued)

OTHER PUBLICATIONS

Guan, M. et al., "A Study on Triacylglycerol Composition and the Structure of High-Oleic Rapseed Oil," In: Engineering 2, pp. 258-262 (2016).
Sanyal, A. et ala, "Erucic acid rapeseed, Prospects of improvements," in: OCL, vol. 22, No. 3, D303 (2015).
International Search Report for International Application No. PCT/SE2020/051170, dated Dec. 29, 2020.
Written Opinion of the International Search Authority for International Application No. PCT/SE2020/051170.
Cindy H. Dubin, *Nothing to Sneeze At*, Pharmaceutical Formulation & Quality Magazine (Jan. 29, 2003).
Per Gisle Djupesland, *Nasal Delivery of Vaccines*, EPC (Jan. 29, 2003).
Per Gisle Djupesland, *Who Nose How Far Nasal Delivery Can Go?*, EPC (Oct. 7, 2003).

(Continued)

*Primary Examiner* — Latosha Hines
(74) *Attorney, Agent, or Firm* — Finnegan, Henderson, Farabow, Garrett & Dunner, LLP

(57) ABSTRACT

A wax composition is disclosed, comprising at least 70% triacylglycerols, wherein the triacylglycerols comprise 0.5 to 50 wt. % of C22 fatty acid. A method of preparing a wax composition is disclosed. A candle comprising the wax composition and a method of preparing a candle are also disclosed.

17 Claims, No Drawings

(56) References Cited

U.S. PATENT DOCUMENTS

| | | |
|---|---|---|
| 9,132,249 B2 | 9/2015 | Djupesland |
| 9,144,652 B2 | 9/2015 | Djupesland et al. |
| 9,168,341 B2 | 10/2015 | Djupesland |
| 9,205,208 B2 | 12/2015 | Djupesland |
| 9,205,209 B2 | 12/2015 | Djupesland |
| 9,272,104 B2 | 3/2016 | Djupesland |
| D759,805 S | 6/2016 | Djupesland |
| D761,951 S | 7/2016 | Djupesland |
| 9,452,272 B2 | 9/2016 | Djupesland et al. |
| 9,468,727 B2 | 10/2016 | Djupesland |
| D773,644 S | 12/2016 | Djupesland |
| 9,522,243 B2 | 12/2016 | Djupesland |
| 9,566,402 B2 | 2/2017 | Djupesland |
| 9,649,456 B2 | 5/2017 | Djupesland et al. |
| D809,128 S | 1/2018 | Djupesland |
| 9,949,923 B2 | 4/2018 | Djupesland |
| 2003/0046860 A1* | 3/2003 | Tiffany ............... C11C 5/002 44/275 |
| 2003/0061760 A1 | 4/2003 | Tao et al. |
| 2004/0024330 A1 | 2/2004 | Djupesland et al. |
| 2004/0112378 A1 | 6/2004 | Djupesland |
| 2004/0112379 A1 | 6/2004 | Djupesland |
| 2004/0112380 A1 | 6/2004 | Djupesland |
| 2004/0149289 A1 | 8/2004 | Djupesland |
| 2004/0182388 A1 | 9/2004 | Djupesland |
| 2004/0221503 A1* | 11/2004 | Murphy ............... C11C 5/008 44/275 |
| 2005/0028812 A1 | 2/2005 | Djupesland |
| 2005/0072430 A1 | 4/2005 | Djupesland |
| 2005/0235992 A1 | 10/2005 | Djupesland |
| 2006/0096589 A1 | 5/2006 | Djupesland |
| 2006/0107957 A1 | 5/2006 | Djupesland |
| 2006/0169278 A1 | 8/2006 | Djupesland et al. |
| 2006/0219240 A1 | 10/2006 | Djupesland |
| 2006/0219241 A1 | 10/2006 | Djupesland |
| 2006/0225732 A1 | 10/2006 | Djupesland |
| 2006/0231094 A1 | 10/2006 | Djupesland |
| 2007/0039614 A1 | 2/2007 | Djupesland |
| 2007/0125371 A1 | 6/2007 | Djupesland |
| 2007/0151840 A1 | 7/2007 | Bloom et al. |
| 2007/0186927 A1 | 8/2007 | Djupesland et al. |
| 2008/0161771 A1 | 7/2008 | Djupesland |
| 2008/0163874 A1 | 7/2008 | Djupesland |
| 2008/0221471 A1 | 9/2008 | Djupesland et al. |
| 2008/0223363 A1 | 9/2008 | Djupesland |
| 2008/0289629 A1 | 11/2008 | Djupesland et al. |
| 2009/0101146 A1 | 4/2009 | Djupesland |
| 2009/0293873 A1 | 12/2009 | Djupesland et al. |
| 2009/0304802 A1 | 12/2009 | Djupesland et al. |
| 2009/0314293 A1 | 12/2009 | Djupesland |
| 2009/0320832 A1 | 12/2009 | Djupesland |
| 2010/0035805 A1 | 2/2010 | Hafner |
| 2010/0051022 A1 | 3/2010 | Djupesland et al. |
| 2010/0057047 A1 | 3/2010 | Djupesland et al. |
| 2010/0199984 A1 | 8/2010 | Williams et al. |
| 2010/0242959 A1 | 9/2010 | Djupesland et al. |
| 2010/0282246 A1 | 11/2010 | Djupesland et al. |
| 2010/0288275 A1 | 11/2010 | Djupesland et al. |
| 2010/0300439 A1 | 12/2010 | Djupesland et al. |
| 2011/0023869 A1 | 2/2011 | Djupesland |
| 2011/0053827 A1 | 3/2011 | Hafner |
| 2011/0088690 A1 | 4/2011 | Djupesland et al. |
| 2011/0088691 A1 | 4/2011 | Djupesland |
| 2011/0114087 A1 | 5/2011 | Djupesland et al. |
| 2011/0120456 A1 | 5/2011 | Immel |
| 2011/0126830 A1 | 6/2011 | Djupesland et al. |
| 2011/0165529 A1 | 7/2011 | Murphy et al. |
| 2011/0259329 A1 | 10/2011 | Djupesland et al. |
| 2011/0318345 A1 | 12/2011 | Djupesland |
| 2012/0000459 A1 | 1/2012 | Djupesland |
| 2012/0006323 A1 | 1/2012 | Djupesland |
| 2012/0073571 A1 | 3/2012 | Djupesland |
| 2012/0090608 A1 | 4/2012 | Djupesland et al. |
| 2012/0260915 A1 | 10/2012 | Djupesland |
| 2013/0098362 A1 | 4/2013 | Djupesland et al. |
| 2013/0125889 A1 | 5/2013 | Djupesland et al. |
| 2013/0327320 A1 | 12/2013 | Djupesland |
| 2014/0018295 A1 | 1/2014 | Djupesland |
| 2014/0041660 A1 | 2/2014 | Djupesland et al. |
| 2014/0060536 A1 | 3/2014 | Djupesland |
| 2014/0073562 A1 | 3/2014 | Djupesland |
| 2014/0144442 A1 | 5/2014 | Djupesland et al. |
| 2014/0144443 A1 | 5/2014 | Djupesland et al. |
| 2014/0166008 A1 | 6/2014 | Djupesland |
| 2014/0202456 A1 | 7/2014 | Djupesland |
| 2014/0246022 A1 | 9/2014 | Djupesland et al. |
| 2015/0007811 A1 | 1/2015 | Djupesland et al. |
| 2015/0013670 A1 | 1/2015 | Djupesland et al. |
| 2015/0013677 A1 | 1/2015 | Djupesland et al. |
| 2015/0053201 A1 | 2/2015 | Djupesland et al. |
| 2015/0090259 A1 | 4/2015 | Djupesland et al. |
| 2015/0101605 A1 | 4/2015 | Djupesland et al. |
| 2015/0144129 A1 | 5/2015 | Djupesland et al. |
| 2015/0165139 A1 | 6/2015 | Hafner |
| 2015/0182709 A1 | 7/2015 | Djupesland |
| 2015/0246194 A1 | 9/2015 | Djupesland et al. |
| 2015/0367090 A1 | 12/2015 | Djupesland et al. |
| 2015/0367091 A1 | 12/2015 | Djupesland et al. |
| 2016/0001022 A1 | 1/2016 | Djupesland et al. |
| 2016/0045687 A1 | 2/2016 | Djupesland |
| 2016/0051778 A1 | 2/2016 | Djupesland et al. |
| 2016/0074603 A1 | 3/2016 | Djupesland et al. |
| 2016/0082206 A1 | 3/2016 | Djupesland et al. |
| 2016/0082207 A1 | 3/2016 | Djupesland et al. |
| 2016/0095989 A1 | 4/2016 | Djupesland |
| 2016/0095993 A1 | 4/2016 | Djupesland |
| 2016/0101249 A1 | 4/2016 | Djupesland |
| 2016/0166788 A1 | 6/2016 | Djupesland et al. |
| 2016/0184537 A1 | 6/2016 | Djupesland |
| 2016/0193435 A1 | 7/2016 | Djupesland |
| 2016/0250408 A1 | 9/2016 | Djupesland |
| 2016/0263334 A1 | 9/2016 | Djupesland |
| 2016/0279357 A1 | 9/2016 | Djupesland |
| 2016/0310683 A1 | 10/2016 | Djupesland et al. |
| 2016/0331916 A1 | 11/2016 | Djupesland et al. |
| 2016/0367771 A1 | 12/2016 | Djupesland |
| 2016/0367772 A1 | 12/2016 | Djupesland |
| 2016/0367774 A1 | 12/2016 | Djupesland et al. |
| 2017/0043108 A1 | 2/2017 | Djupesland et al. |
| 2017/0151397 A1 | 6/2017 | Djupesland |
| 2017/0203061 A1 | 7/2017 | Djupesland et al. |
| 2017/0216540 A1 | 8/2017 | Djupesland |
| 2017/0253832 A1 | 9/2017 | Murphy et al. |
| 2017/0274164 A1 | 9/2017 | Djupesland et al. |
| 2017/0333649 A1 | 11/2017 | Djupesland |

FOREIGN PATENT DOCUMENTS

| | | |
|---|---|---|
| EP | 0 427 309 B1 | 12/1994 |
| EP | 2 724 620 A1 | 4/2014 |
| WO | WO 96/22802 | 8/1996 |
| WO | WO 98/53869 | 12/1998 |
| WO | WO 00/51672 | 9/2000 |
| WO | WO 01/97689 | 12/2001 |
| WO | WO 02/068029 | 9/2002 |
| WO | WO 02/068030 | 9/2002 |
| WO | WO 02/068031 | 9/2002 |
| WO | WO 02/068032 | 9/2002 |
| WO | WO 02/092736 A1 | 11/2002 |
| WO | WO 03/000310 | 1/2003 |
| WO | WO 03/020350 | 3/2003 |
| WO | WO 03/037095 A1 | 5/2003 |
| WO | WO 03/082393 | 10/2003 |
| WO | WO 03/084591 | 10/2003 |
| WO | WO 03/090812 | 11/2003 |
| WO | WO 2004/004814 | 1/2004 |
| WO | WO 2004/004922 | 1/2004 |
| WO | WO 2004/060433 | 7/2004 |
| WO | WO 2004/103447 | 12/2004 |
| WO | WO 2005/016423 | 2/2005 |
| WO | WO 2005/021059 | 3/2005 |
| WO | WO 2006/030210 | 3/2006 |
| WO | WO 2006/090149 | 8/2006 |
| WO | WO 2007/083073 | 7/2007 |

(56) References Cited

FOREIGN PATENT DOCUMENTS

| | | |
|---|---|---|
| WO | WO 2007/093784 | 8/2007 |
| WO | WO 2007/093791 | 8/2007 |
| WO | WO 2007/099361 | 9/2007 |
| WO | WO 2007/102089 | 9/2007 |
| WO | WO 2007/107887 | 9/2007 |
| WO | WO 2007/125318 | 11/2007 |
| WO | WO 2007/141541 | 12/2007 |
| WO | WO 2008/012531 | 1/2008 |
| WO | WO 2008/065403 | 6/2008 |
| WO | WO 2008/081326 | 7/2008 |
| WO | WO 2008/081327 | 7/2008 |
| WO | WO 2008/103289 A1 | 8/2008 |
| WO | WO 2008/122791 | 10/2008 |
| WO | WO 2008/122795 | 10/2008 |
| WO | WO 2009/044172 | 4/2009 |
| WO | WO 2010/029441 | 3/2010 |
| WO | WO 2012/035427 | 3/2012 |
| WO | WO 2012/123819 | 9/2012 |
| WO | WO 2013/124491 | 8/2013 |
| WO | WO 2013/124492 | 8/2013 |
| WO | WO 2013/124493 | 8/2013 |
| WO | WO 2014/155192 | 10/2014 |
| WO | WO 2018/111181 A1 | 6/2018 |
| WO | WO 2020/070321 | 4/2020 |

OTHER PUBLICATIONS

Per Gisle Djupesland, *Bi-directional Nasal Drug Delivery*, Innovations in Pharmaceutical Technology (Jul. 10, 2004).
P.G. Djupesland, *Bi-Directional Nasal Delivery of Aerosols Can Prevent Lung Deposition*, Journal of Aerosol Medicine (Sep. 2004).
*Bi-Directional Nasal Device Delivers Drug on Exhalation*, Pharmaceutical Technology (Sep. 10, 2004).
Ola Dale et al., *Intranasal Midazolam: A Comparison of Two Delivery Devices in Human Volunteers*, Journal of Pharmacy and Pharmacology (Oct. 2004).
G. Furness, *Nasal Drug Delivery: Rapid Onset Via A Convenient Route*, ONdrugDelivery Ltd. (2005).
M. Kleven, *Using Computational Fluid Dynamics (CFD) to Improve the Bi-Directional Nasal Drug Delivery Concept*, Trans IChemE Part C. (Jun. 2005).
Per Gisle Djupesland, *Breath-Actuated Bi-Directional Delivery Sets the Nasal Market on a New Course*, ONdrug Delivery (Oct. 10, 2005).
Hilde Bakke et al., *Oral Spray Immunization May be An Alternative to Intranasal Vaccine Delivery to Induce Systemic Antibodies But Not Nasal Mucosal or Cellular Immunity*, Scan J. of Immunol. (Mar. 2006).
P.G. Djupesland et al., *Breath Actuated Nasal Device Improves Delivery to Target Sites Beyond the Nasal Valve*, The Laryngoscope (Mar. 2006).

R. Luthringer et al., *Rapid Absorption of Sumatriptan Powder and Effects on Glyceryl tinitrate Model of Headache Following Intranasal Delivery Using A Novel Bi-Directional Device*, Journal of Pharmacy and Pharmacology (Jan. 2009).
A. Skretting et al., *A New Method for Scintigraphic Quantification of Deposition and Clearance in Anatomical Regions of the Human Nose*, Nuclear Medicine Communications (Aug. 2009).
Vickovia et al., *Effective Treatment Of Mild-to-Moderate Nasal Polyposis with Fluticasone Delivered By A Novel Device*, Rhinology (Oct. 22, 2009).
Per Gisle Djupesland et al., *Impact of Baseline Nasal Polyp Size and Previous Surgery on Efficacy of Fluticasone Delivered With a Novel Device: A Subgroup Analysis*, Am. J. Rhinology Allergy (2010).
P.G. Djupesland et al., *Intranasal Sumatriptan Powder Delivered by a Novel Breath Actuated Bi-Directional Device for the Acute Treatment of Migraine: A Randomised Placebo-Controlled Study*, Cephalalgia (Mar. 17, 2010).
F.S. Hansen et al., *Preliminary Efficacy of Fluticasone Delivered By a Novel Device in Recalcitrant Chronic Rhinosinusitis*, Rhinology (Jun. 26, 2010).
Per Gisle Djupesland, *Nasal Drug Delivery Devices: Characteristics and Performance in Clinical Perspective—A Review*, Drug. Deliv. and Transl. Res. (Oct. 18, 2012).
Per Gisle Djupesland, *Nasal Deposition and Clearance in Man: Comparison of a Bidirectional Powder Device and a Traditional Liquid Spray Pump*, Journal of Aerosol Medicine and Pulmonary Drug Delivery (Nov. 2012).
Stewart J. Tepper, *Clinical Implications for Breath-Powered Powder Sumatriptan Intranasal Treatment*, Headache, The American Headache Society (Apr. 29, 2013).
Mohammad Obaidi et al., *Improved Pharmacokinetics of Sumatriptan With Breath Powered Nasal Delivery of Sumatriptan Powder*, Headache, The American Headache Society (May 24, 2013).
Per Gisle Djupesland, *Breath Powdered Nasal Delivery: A New Route to Rapid Headache Relief*, Headache, The American Headache Society (Jun. 4, 2013).
Per Gisle Djupesland et al., *The Nasal Approach to Delivering Treatment for Brain Diseases: An Anatomic, Physiologic, and Delivery Technology Overview*, Therapeutic Delivery (2014).
R.K. Cady et al., *A Randomized Double-Blind, Placebo Controlled Study of Breath Powered Nasal Delivery of Sumatriptan Powder (AVP-825) in the Treatment of Acute Migraine (The TARGET Study)*, Headache (Sep. 8, 2014).
S.J. Tepper et al., *AVP-825 Breath-Powdered Intranasal Delivery System Containing 22 mg Sumatriptan Powder vs. 100 mg Oral Sumatripta in the Acute Treatment of Migraines (The COMPASS Study): A Comparative Randomized Clinical Trial Across Multiple Attacks*, Headache: The Journal of Head and Face Pain (Mar. 29, 2015).
D. S. Quintana et al., *Low-dose Oxytocin Delivered Intranasally with Breath Powdered Device Affects Social-Cognitive Behavior: A Randomized Four-Way Crossover Trial with Nasal Cavity Dimension Assessment*, Transl Psychiatry (Jul. 14, 2015).
R. Mahmoud, *Breathe Out*, Innovations in Phar, Tech. (Dec. 10, 2015).

* cited by examiner

WAX COMPOSITIONS FOR USE IN CANDLES AND METHODS OF PREPARING WAX COMPOSITIONS This is a continuation application of U.S. application Ser. No. 17/757,042, filed Jun. 8, 2022, which is a national stage filing under 35 U.S.C. § 371 of International Application No. PCT/SE2020/051170, filed on Dec. 4, 2020, which claims priority to European Patent Application No. 1951416-5, filed on Dec. 9, 2019, the entire contents of each of which are incorporated herein by reference.

TECHNICAL FIELD

The present invention relates generally to wax compositions for the manufacture of candles and methods to produce the wax composition.

BACKGROUND

Candles have been used for illumination purposes for thousands of years. More recently, natural waxes such as beeswax and tallow were substituted by paraffin, which is obtained from the petroleum refining industry.

The document WO02/092736A1 describes a triacylglycerol-based candle wax having a polyol partial ester component and a melting point of 54° C. to 63° C. The iodine value of the wax is 20-40.

The document US2017/0253832A1 describes a wax composition comprising a hydrogenate natural oil with at least about 50 wt % of a triacylglycerol component having a fatty acid composition from about 14 to about 25 wt % C16:0 fatty acid, about 45 to about 60 wt % C18:1 fatty acid and about 20 to about 30 wt % C18:0 fatty acid, (ii) a nickel content of less than 1 ppm, and (iii) a melt point of about 49° C. to about 57° C.

The document U.S. Pat. No. 7,128,766B2 describes a wax composition having a high triacylglycerol content and a melting point of about 50° C. to 57° C. The fatty acid composition includes about 14 to 25 wt. % % 16:0 fatty acid, about 20 to 30 wt. % 18:0 fatty acid and about 45 to 60 wt. % 18:1 fatty acid.

The document U.S. Pat. No. 6,773,469B2 describes a triacylglycerol-based wax, which includes a triacylglycerol component and a polyol fatty acid partial ester component, and a candle made from a triacylglycerol-based wax. The triacylglycerol-based wax generally has a melting point of about 60° C. to 66° C. and an iodine value from 10 to 20. The triacylglycerol component generally has a fatty acid composition including about 5 to 15 wt. %. 16:0 fatty acid. The triacylglycerol component generally has a fatty acid composition including about 75 to 85 wt. % total saturated fatty acid.

Further, the triacylglycerol component generally has a fatty acid composition including about 65 to 80 wt. % 18:0 fatty acid.

The document WO2008/103289A1 describes a wax composition comprising the (trans) esterification product of a wax-forming composition comprising: (a) a triacylglycerol stock, a fatty acid stock, or a mixture thereof; and (b) a glycerol-based composition comprising glycerol, polyglycerol, or a mixture thereof.

Environmental concerns have urged the industry to find alternatives to paraffin, especially regarding renewable wax sources. Moreover, it would be advantageous to produce candles with reduced frosting effect and cracks, while maintaining a good burning rate.

SUMMARY OF THE INVENTION

An object of the present invention is to reduce or eliminate one or more of the above shortcomings by providing an improved wax composition. The improved wax composition may be used for the manufacture of candles.

DETAILED DESCRIPTION

One object of the invention is to provide a candle with reduced or absent frosting effect, i.e., ensuring a nice appearance even when used. Another object of the invention is to provide a wax composition that produces a candle with good burn rate. The composition disclosed in the application can be regarded as safer since a lower temperature is needed during the manufacture of candles. Moreover, the composition can be regarded as having a good energy saving rate during manufacturing of candles. Another object of the invention is that the disclosed wax composition can be combined with cheaper waxes, therefore generating an improved or more stable and low-cost candle.

Thus, the invention relates to providing a wax composition comprising at least 70 wt. % of triacylglycerols (based on the total weight of the composition), wherein the triacylglycerols comprise 0.5 to 50 wt. % of C22 fatty acid (based on the total weight of the triacylglycerols). In one embodiment the invention relates to providing a wax composition comprising at least 70 wt. % of triacylglycerol and below 5% of monoacylglycerols (based on the total weight of the composition), wherein the triacylglycerols comprise 0.5 to 50 wt. % of C22 fatty acid (based on the total weight of the triacylglycerols). The triacylglycerols may be obtained from partly hydrogenated oils, fully hydrogenated oils or non-hydrogenated oils. The triacylglycerols may be obtained from a combination of partly hydrogenated oils, fully hydrogenated oils or non-hydrogenated oils. The wax composition may comprise a triacylglycerol comprising 0.5 to 100 wt. % of partially hydrogenated high erucic rapeseed oil. The wax composition may comprise a triacylglycerol comprising 0.5 to 100 wt. % of fully hydrogenated or non-hydrogenated high erucic rapeseed oil.

Fully hydrogenated oil refers to an oil which has been hydrogenated to an Iodine Value of no more than about 4. Partially hydrogenated oil refers to an oil which has been partially hydrogenated to an iodine value of 4-75.

In addition to varieties of rape seed oil, palm oil, soy bean oil and palm oil, also other oils such as sunflower, corn oil, cottonseed oil, shea butter, cocoa butter, sal butter, mango butter, olive oil, safflower oil, palm kernel oil and other vegetable oils are suitable as part of a wax composition.

The vegetable oil used in the wax composition is typically refined, bleached and/or deodorized. The vegetable oil may be subjected to refining, fractioning and/or hydrogenation prior to use.

In one exemplary embodiment, the wax composition comprises at least 90 wt. % of triacylglycerols (based on the total weight of the composition), wherein the triacylglycerols comprises 0.5 to 49 wt. % of partially hydrogenated high erucic rapeseed oil and 0.5 to 26 wt. % of C22 fatty acid (based on the total weight of the triacylglycerols). In another embodiment, the triacylglycerols comprise up to 20 wt. % of C22:0 fatty acid and 0.5 to 25% wt. of C22:1 fatty acid.

By using the nomenclature CX means that the fatty acid comprises X carbon atoms, e.g. a C22 fatty acid has 22 carbon atoms while a C8 fatty acid has 8 carbon atoms.

By using the nomenclature CX:Y means that the fatty acid comprises X carbon atoms and Y double bonds, e.g. a C22:0 fatty acid has 22 carbon atoms and 0 double bonds while a C22:1 fatty acid has 22 carbon atoms and 1 double bond.

The C22:0 fatty acids are saturated fatty acids having 22 carbons with formula $C_{21}H_{43}COOH$. C22:0 fatty acids can be called behenic acid or docosanoic acid.

The C22:1 fatty acids are unsaturated fatty acids having 22 carbons and formula $CH_3(CH_2)_7CH=CH(CH_2)_{11}COOH$. C22:1 fatty acids can be called erucic acid.

In another exemplary embodiment, the wax composition may comprise triacylglycerols comprising 2 to 29 wt. % of partially hydrogenated high erucic rapeseed oil and 1 to 15 wt. % of C22 fatty acid. In yet another exemplary embodiment, the wax composition may comprise triacylglycerols comprising up to 8 wt. % of C22:0 fatty acid and 1 to 15% wt. of C22:1 fatty acid, preferably up to 8 wt. % of C22:0 fatty acid and 2.5 to 15 wt. % of C22:1 fatty acid.

In yet another exemplary embodiment, the wax composition may comprise triacylglycerols comprising up to 10 wt. % of C22:0 fatty acid and 0.5 to 34% wt. of C22:1 fatty acid, preferably up to 10 wt. % of C22:0 fatty acid and 1.1 to 34 wt. % of C22:1 fatty acid, preferably up to 10 wt. % of C22:0 fatty acid and 2 to 34 wt. % of C22:1 fatty acid, preferably up to 10 wt. % of C22:0 fatty acid and 4 to 34 wt. % of C22:1 fatty acid, preferably up to 10 wt. % of C22:0 fatty acid and 5 to 34 wt. % of C22:1 fatty acid, preferably up to 10 wt. % of C22:0 fatty acid and 16 to 34 wt. % of C22:1 fatty acid.

In yet another exemplary embodiment, the wax composition may comprise triacylglycerols comprising up to 10 wt. % of C22:0 fatty acid and 0.5 to 34% wt. of C22:1 fatty acid, preferably up to 5 wt. % of C22:0 fatty acid and 0.5 to 5 wt. % of C22:1 fatty acid, preferably up to 5 wt. % of C22:0 fatty acid and 2 to 20 wt. % of C22:1 fatty acid.

From the Examples it is clear that a minimum of 0.5 wt. % C22:1 is beneficial for the overall appearance and efficacy of burning of said candles. Thus, in a preferred embodiment at least 0.5 wt. % of the C22 is in the form of C22:1.

In some embodiments, the wax composition has a melting point of 35° C. to 52° C. It is known in the art that the melting point of a wax composition may depend on the amount of saturated and unsaturated fatty acids. Typically, an increasing concentration of saturated fatty acids is followed by an increase in the melting point of the wax composition. On the other hand, an increase in the unsaturated fatty acid concentration may lead to a decrease in the melting point of the wax composition.

In another exemplary embodiment, the partially hydrogenated high erucic rapeseed oil has an iodine value of 6 to 75. Measuring the iodine value of a wax composition is known in the art. The iodine value is a measure of the unsaturation of the fatty acids present in a triacylglycerol. The higher the level of unsaturation, the higher the iodine value.

In one exemplary embodiment, the wax composition may comprise a second oil, preferably soybean oil, palm oil, coconut oil or rapeseed oil. The oils may be subsequently partially hydrogenated after blending. In another embodiment, at least one of the oils may be partially hydrogenated before blending.

One advantage of the disclosed invention is to provide a wax composition that may be blended with a second oil. The wax composition may be blended with a cheaper oil, therefore improving the composition by, for instance, increasing the stabilization of the wax composition, and generating a cheaper wax composition or candle. The wax composition can be blended with another oil in a concentration ranging from 10 to 100 wt. %, preferably 10 to 15 wt. %. The wax composition may be partially or fully hydrogenated before blending with a second oil. The wax composition may be partially or fully hydrogenated after blending with a second oil. A partially hydrogenated high erucic rape seed oil can be used alone or in a blend to make the wax composition.

The wax composition may further comprise at least one polyol-based material, preferably sorbitan tristearate, sorbitan monostearate, monoacylglycerol, polyglycerol stearate, propyleneglycol stearate or polyglycerol polyricinolates and combinations thereof. The skilled person knows that any combination of those polyol-based materials and their variants can be used in the wax composition. The wax composition may also further comprise paraffin.

The wax composition may comprise a partially hydrogenated high erucic rapeseed oil blended with a fully hydrogenated high erucic rapeseed oil to a final concentration of 1-100 wt. %.

In some embodiments, the wax composition may comprise triacylglycerols comprising an interesterified triacylglycerol. Triacylglycerols can be subjected to a process of interesterification, which can be defined as a rearrangement of the fatty acids in an oil. The interesterification process can be enzymatically or chemically driven.

Another embodiment of the invention is to provide a method of preparing a wax composition comprising the steps of:
 a. providing a triacylglycerol comprising 0.5 to 50 wt. % of C22 fatty acid;
 b. mixing the triacylglycerol with at least one oil, preferably soybean oil, palm oil, coconut oil or rapeseed oil; and
 c. obtaining the wax composition.

In addition to varieties of rape seed oil, palm oil, soy bean oil and palm oil, also other oils such as sunflower, corn oil, cottonseed oil, shea butter, cocoa butter, sal butter, mango butter, olive oil, safflower oil, palm kernel oil and other vegetable oils are suitable as part of a method of preparing a wax composition.

A triacylglycerol provided in this method may comprise 0.5 to 26 wt. % of C22 fatty acid, preferably 1 to 26 wt. %, even more preferably 2 to 20 wt. %.

Surprisingly, it was found that the obtained wax composition can be handled at safer temperatures, with less or no risk of severe burning during the manufacture of candles. The wax composition showed reduced or absent frosting effects, ensuring a nice appearance for the customer—even when used—and with good burn rate.

One advantage of the invention is to provide a wax composition that generates a candle with less or no cracks, i.e., the candle is less prone to break during the manufacturing process or after extinguishing the flame from the candle.

Another advantage of the invention is to provide a wax composition that generates a candle with good burn rate. The burn rate can be defined as the amount of candle substrate consumed per hour when the candle is in use. For instance, the burn rate can be measured by grams/hour.

Another advantage of the invention is to provide a wax composition that generates a candle having a good height of the flame. It is known by the skilled person in the art that the higher the height of the flame, the more volume is illuminated. It is desirable to have a candle having a good ratio of average flame height per consumed material per time (mm/g/h). A ratio of at least 5 mm/g/h can be regarded as a good ratio.

Yet another advantage of the invention is to provide a wax composition that generates a candle with a smooth surface.

The smooth surface is related to the visual aspect of the surface of the candle, where a smooth shiny surface is preferred.

Another exemplary embodiment of the method of preparing a wax composition comprises obtaining 0.5 to 50 wt. % of C22 fatty acid from a high erucic rapeseed oil. In another embodiment, at least one of the oils may be a partially hydrogenated oil. The method of preparing a wax composition may further comprise a step of interesterification of triacylglycerols.

The method of preparing a wax composition may further comprise adding at least one polyol-based material to the wax composition, preferably sorbitan tristearate, monoacylglycerol sorbitan monostearate, polyglycerol stearate, propyleneglycol stearate or polyglycerol polyricinolates and combinations thereof. In another embodiment, the method may further comprise mixing paraffin to the wax composition.

Another exemplary embodiment of the invention is to provide a candle comprising a wax composition according to previous embodiments. The candle may be prepared according to method of preparing a wax composition from previous embodiments.

Surprisingly, it was found that the candle according to the disclosed embodiments may have a reduced or absent frosting effect, i.e., the candle keeps a nice appearance even when used. Another advantage of the invention is to provide a candle with good burn rate. The candle disclosed in the application can be regarded as safer since a lower temperature is needed during manufacture of candles. Moreover, the method of preparing a wax composition can be regarded as having a good energy saving rate due to the lower temperature needed. Another advantage of the invention is that the disclosed candle can be produced by combining the disclosed wax composition with cheaper waxes, therefore generating an improved or more stable and low-cost candle.

The Invention is Further Described in Following Non-Limiting Items

Item 1: A wax composition, comprising at least 70 wt. % triacylglycerols based on the total weight of the composition, wherein the triacylglycerols comprise 0.5 to 50 wt. % of C22 fatty acid based on the total weight of the triacylglycerols.

Item 2: The wax composition according to item 1, wherein the triacylglycerols comprise 0.5 to 100 wt. % of partially hydrogenated high erucic rapeseed oil.

Item 3: The wax composition according to item 2, wherein the wax comprises at least 90 wt % of triacylglycerols based on the total weight of the composition, and wherein the triacylglycerols comprise 0.5 to 49 wt. % of partially hydrogenated high erucic rapeseed oil and 0.5 to 26 wt. % of C22 fatty acid based on the total weight of the triacylglycerols.

Item 4: The wax composition according to any one of items 1-3, wherein the triacylglycerols comprise up to 20 wt. % of C22:0 fatty acid and 0.5 to 25 wt. %. of C22:1 fatty acid.

Item 5: The wax composition according to any one of items 1-4, wherein the triacylglycerols comprise 2 to 29 wt. % of partially hydrogenated high erucic rapeseed oil and 1 to 15 wt. % of C22 fatty acid.

Item 6: The wax composition according to any one of items 1-5, wherein the triacylglycerols comprise up to 8 wt. % of C22:0 fatty acid and 1 to 15 wt. %. of C22:1 fatty acid, preferably up to 8 wt. % of C22:0 fatty acid and 2.5 to 15 wt. % of C22:1 fatty acid.

Item 7: The wax composition according to any one of items 1-6, wherein the wax composition comprises at least 70 wt. % of triacylglycerol and below 5% of monoacylglycerols based on the total weight of the composition, wherein the triacylglycerols comprise 0.5 to 50 wt. % of C22 fatty acid based on the total weight of the triglycerides.

Item 8: The wax composition according to any one of items 1-7, wherein at least 0.5 wt. % of the C22 is in the form of C22:1.

Item 98: The wax composition according to any one of items 1-8, wherein the wax has a melting point of 35° C. to 52° C.

Item 10: The wax composition according to any one of items 2-9, wherein the partially hydrogenated high erucic rapeseed oil has an iodine value of 6 to 75.

Item 11: The wax composition according to any one items 1-10, further comprising at least a second oil, preferably soybean oil, palm oil, coconut oil or rapeseed oil.

Item 12: The wax composition according to item 11, wherein said oils are subsequently partially hydrogenated after blending.

Item 13: The wax composition according to any one of items 1-112, wherein the wax further comprises at least one polyol-based material, preferably a sorbitan tristearate, monoacylglycerol, sorbitan monostearate, polyglycerol stearate, propyleneglycol stearate or polyglycerol polyricinolates and combinations thereof.

Item 14: The wax composition according to any one of items 1-13, wherein the wax further comprises a paraffin.

Item 15: The wax composition according to any of items 2-14, wherein the partially hydrogenated high erucic rapeseed oil is blended to a fully hydrogenated high erucic rapeseed oil to a final concentration of 1-100 wt. %.

Item 16: The wax composition according to any of items 1-15, wherein the triacylglycerols comprise an interesterified triacylglycerol.

Item 17: A method of preparing a wax composition comprising the steps of:
 a. providing a triacylglycerol comprising 0.5 to 50 wt. % of C22 fatty acid;
 b. mixing the triacylglycerol with at least one oil, preferably soybean oil, palm oil, coconut oil or rapeseed oil; and
 c. obtaining the wax composition.

Item 18: The method according to item 17, wherein the triacylglycerol comprising 0.5 to 50 wt. % of C22 fatty acid is obtained from a high erucic rapeseed oil.

Item 19: The method according to items 17 or 18, wherein at least one of the oils is a partially hydrogenated oil.

Item 20: The method according to any one of items 17-19, further comprising a step of interesterification of triacylglycerols.

Item 21: The method according to any of items 17-20, further comprising adding at least one polyol-based material, preferably sorbitan tristearate, monoacylglycerol, sorbitan monostearate, polyglycerol stearate, propyleneglycol stearate or polyglycerol polyricinolates and combinations thereof.

Item 22: The method according to any of items 17-21, further comprising a step of mixing paraffin to the wax composition.

Item 23: A candle comprising a wax composition according to any one of items 1 to 16.

Item 24: The candle according to item 23, prepared by a method according to any one of items 17 to 22.

EXAMPLES

The iodine value in the below examples was calculated based on fatty acid composition according to AOCS Cd 1c-85.

The fatty acid composition in the below examples was analyzed according to IUPAC 2.304.

Raw Material:

One example of a high erucic rapeseed oil composition can be found on Table 1:

TABLE 1

| Iodine Value | 100 |
|---|---|
| Fatty acid composition | |
| C16:0 | 4% |
| C18:0 | 1% |
| C18:1 | 14% |
| C18:2 | 13% |
| C18:3 | 9% |
| C20:1 | 9% |
| C22:0 | <0.5% |
| C22:1 | 48% |
| Other | 2% |

Example 1: (E1)

1150 grams of a palm oil and 3850 grams of a low erucic rape seed oil was blended and partially hydrogenated, then bleached and deodorized. The composition was characterised as set in Table 2. The triacylglycerol level was above 99%.

TABLE 2

| Melting point ° C. | 66 |
|---|---|
| Iodine Value | 11 |
| Fatty acid composition | |
| C16:0 | 17% |
| C18:0 | 68% |
| C18:1 | 9% |
| C18:2 | 2% |
| C22:0 | 1% |
| C22:1 | <0.5% |
| Other | 4% |

Example 2: (E2)

1 kg of bleached and deodorized wax composition of a palm oil fraction with the characterization as set in Table 3. The triacylglycerol level was above 99%.

TABLE 3

| Melting point ° C. | 55 |
|---|---|
| Iodine Value | 31 |
| Fatty acid composition | |
| C16:0 | 57% |
| C18:0 | 5% |
| C18:1 | 29% |
| C18:2 | 6% |
| C22:0 | <0.5% |
| C22:1 | <0.5% |
| Other | 3% |

Example 3: (E3)

5 kg of wax composition of a partially hydrogenated, fractionated, bleached and deodorized palm oil with the characterization as set in Table 4. The triacylglycerol level was above 99%.

TABLE 4

| Melting point ° C. | 42 |
|---|---|
| Iodine Value | 41 |
| Fatty acid composition | |
| C16:0 | 50% |
| C18:0 | 6% |
| C18:1 | 37% |
| C18:2 | 5% |
| C22:0 | <0.5% |
| C22:1 | <0.5% |
| Other | 1% |

Example 4: (E4)

1 kg of wax composition of a bleached and deodorized blend of palm oil (30%) and fully hydrogenated soy bean oil (70%) with the characterization as set in Table 5. The triacylglycerol level was above 99%.

TABLE 5

| Melting point ° C. | 43 |
|---|---|
| Iodine Value | 16 |
| Fatty acid composition | |
| C16:0 | 23% |
| C18:0 | 60% |
| C18:1 | 12% |
| C18:2 | 3% |
| C22:0 | <0.5% |
| C22:1 | <0.5% |
| Other | 1% |

Example 5: (E5)

1 kg of wax composition of bleached and deodorized palm oil fraction with the characterization as set in Table 6. The triacylglycerol level was above 99%.

TABLE 6

| Melting point ° C. | 45 |
|---|---|
| Iodine Value | 43 |
| Fatty acid composition | |
| C16:0 | 51% |
| C18:0 | 5% |
| C18:1 | 34% |
| C18:2 | 8% |
| C22:0 | <0.5% |
| C22:1 | <0.5% |
| Other | 2% |

Example 6: (E6)

5 kg of a high erucic oil were partially hydrogenated, bleached and deodorized. The partially hydrogenated High erucic wax composition was characterized as set in Table 7 below. The triacylglycerol level was above 99%.

TABLE 7

| | |
|---|---|
| Iodine Value | 62 |
| Fatty acid composition | |
| C16:0 | 4% |
| C18:0 | 5% |
| C18:1 | 33% |
| C18:2 | 4% |
| C22:0 | 10% |
| C22:1 | 35% |
| Other | 11% |

Example 7: (E7)

Akofine R is a commercially available fully hydrogenated rapeseed oil characterized by the triacylglycerols as in table 8 below and by having <2 in iodine value.

TABLE 8

| | |
|---|---|
| Melting point ° C. | 60 |
| Iodine Value | 0 |
| Fatty acid composition | |
| C16:0 | 4% |
| C18:0 | 40% |
| C18:1 | <0.5% |
| C18:2 | <0.5% |
| C22:0 | 45% |
| C22:1 | <0.5% |
| Other | 11% |

Example 8: (E8)

5 kg of a rape seed oil, low in erucic acid was partially hydrogenated, bleached and deodorized. The partially hydrogenated wax composition was characterized as set in Table 9 below. The triacylglycerol level was above 99%.

TABLE 9

| | |
|---|---|
| Iodine Value | 61 |
| Fatty acid composition | |
| C16:0 | 4% |
| C18:0 | 25% |
| C18:1 | 67% |
| C18:2 | 2% |
| C22:0 | <0.5% |
| C22:1 | <0.5% |
| Other | 2% |

Example 9: (E9)

116 grams of example 6, 40 grams of example 7 and 744 g of Example 8 was blended creating a wax composition with the characterization as set in Table 10 below. The triacylglycerol level was above 99%.

TABLE 10

| | |
|---|---|
| Melting point ° C. | 45 |
| Iodine Value | 59 |
| Fatty acid composition | |
| C16:0 | 4% |
| C18:0 | 24% |
| C18:1 | 63% |
| C18:2 | 2% |

TABLE 10-continued

| | |
|---|---|
| C22:0 | 3% |
| C22:1 | 4% |
| Other | 3% |

Example 10 (E10)

120 gram of Example 9 and 880 grams of Example 5 was blended giving the total wax composition as characterized in Table 11 below. The triacylglycerol level was above 99%.

TABLE 11

| | |
|---|---|
| Melting point ° C. | 44 |
| Iodine Value | 44 |
| Fatty acid composition | |
| C16:0 | 46% |
| C18:0 | 8% |
| C18:1 | 37% |
| C18:2 | 7% |
| C22:0 | <0.5% |
| C22:1 | 0.5% |
| Other | 2% |

Example 11

The compositions E1 and E2 were melted to 80° C. and kept at 80° C. for 30 minutes. E3-E5, E9 and E10 were melted to 50° C. and kept at 50° C. for 30 minutes. 250 grams of each composition (E1-E5, E9 and E10) were added to glass jars including a wicket, respectively. The wicket used was Wick/TLR 15/50/23-NST-7. The filled jars were cooled to room temperature under ambient conditions. After two weeks of storage the samples were evaluated as seen in Table 12 below.

TABLE 12

| | E1 | E2 | E3 | E4 | E5 | E9 | E10 |
|---|---|---|---|---|---|---|---|
| Smooth surface | 1 | 1 | 2 | 1 | 2 | 5 | 4.5 |
| Cracking surface | 5 | 4 | 5 | 1 | 5 | 4.5 | 4.5 |
| Frosting | 1 | 3 | 3 | 3 | 4 | 5 | 3 |
| Cracking on the side | 1 | 5 | 5 | 1 | 5 | 5 | 5 |
| Surface on the bottom | 3 | 3 | 4 | 4 | 2 | 4.5 | 4 |
| Total | 11 | 16 | 19 | 10 | 18 | 24 | 21 |

Smooth surface represents the visual aspect of the surface, where a smooth shiny surface is wished for resulting in a score of 5. A score of one (1) is a rough and not attractive surface.

Cracks are not wished for. No cracks results in a score of 5 while a score of 1 represent several large cracks.

Frosting is related to the appearance of white patches on the top or side of the candles. They appear very quickly after the cooling process and is not considered nice. A score of 5 means no sign of white patches which a score of one is full coverage of white patches.

Scores which is 4 and 5 are acceptable levels for all parameters evaluated.

Example E1 and E2 required much higher handling temperatures (80° C.) than the samples E9 and E10 due to the high melting point of the wax composition. Samples E9 and E10 required a lower and safer temperature of 50° C. Therefore, this ensures a safer working environment and is thus an advantage.

In addition, the surfaces of E1 and E2 were not smooth. Especially for sample E1, the frosting parameter were extremely poor.

E3 and E4 resulted in poor surface appearances as well as low frosting scores.

E5 had a rather reasonable frosting effect but the surface was not smooth at all hence ended in an overall less desirable appearance.

E9 was the only sample reaching acceptable levels in all criteria. It was shown (E10) that a small addition of high erucic rapeseed oil (resulting in 0.5% of C22:1 fatty acids) was enough to improve the overall appearance of E5 and especially the surface appearance.

Example 12 (E12)

A partially hydrogenated rape seed oil followed by bleaching and deodorization was made. The created wax composition was characterized as set in Table 13 below. The triacylglycerol level was above 99%.

TABLE 13

| Iodine Value | 75 |
|---|---|
| Fatty acid composition | |
| C16:0 | 5% |
| C18:0 | 1% |
| C18:1 | 83% |
| C18:2 | 2% |
| C22:0 | <0.5% |
| C22:1 | <0.5% |
| Other | 3% |

Example 13 (E13)

A partially hydrogenated blend of rape seed oil (19%) and palm oil (81%) followed by bleaching and deodorization was made. The created wax composition was characterized as set in Table 14 below. The triacylglycerol level was above 99%.

TABLE 14

| Iodine Value | 49 |
|---|---|
| Fatty acid composition | |
| C16:0 | 37% |
| C18:0 | 11% |
| C18:1 | 43% |
| C18:2 | 7% |
| C22:0 | <0.5% |
| C22:1 | <0.5% |
| Other | 2% |

Example 14 (E14)

A partially hydrogenated rape seed oil followed by bleaching and deodorization was made. The created wax composition was characterized as set in Table 15 below. The triacylglycerol level was above 99%.

TABLE 15

| Iodine Value | 69 |
|---|---|
| Fatty acid composition | |
| C16:0 | 5% |
| C18:0 | 15% |
| C18:1 | 74% |
| C18:2 | 3% |
| C22:0 | <0.5% |
| C22:1 | <0.5% |
| Other | 3% |

Example 15 (E15)

5 kg of wax composition of a blend of palm oil (10%), coco nut oil (10%) and rape seed oil (80%) were partially hydrogenated, bleached and deodorized characterized as set in Table 16 below. The triacylglycerol level was above 99%.

TABLE 16

| Iodine Value | 43 |
|---|---|
| Fatty acid composition | |
| C12:0 | 5% |
| C16:0 | 7% |
| C18:0 | 35% |
| C18:1 | 46% |
| C18:2 | 2% |
| C22:0 | <0.5% |
| C22:1 | <0.5% |
| Other | 5% |

Example 16 (E16)

970 grams of Example 15 and 30 grams of sorbitan tristearate (STS, CAS 26658-19-5) blended giving the total wax composition as characterized in Table 17 below. The triacylglycerol level was above 97%. STS is a polyolester.

TABLE 17

| Iodine Value | 42 |
|---|---|
| Fatty acid composition | |
| C12:0 | 5% |
| C16:0 | 7% |
| C18:0 | 35% |
| C18:1 | 46% |
| C18:2 | 2% |
| C22:0 | <0.5% |
| C22:1 | <0.5% |
| Other | 5% |

Example 17 (E17)

120 grams of example 6 and 880 grams of example 12 was blended resulting in a wax composition characterized as set in Table 18 below. The triacylglycerol level was above 99%.

TABLE 18

| Iodine Value | 79 |
|---|---|
| Fatty acid composition | |
| C16:0 | 5% |
| C18:0 | 0.5% |
| C18:1 | 83% |
| C18:2 | 2% |
| C22:0 | 1.5% |
| C22:1 | 4% |
| Other | 4% |

Example 18 (E18)

470 grams of example 6 and 530 grams of example 13 was blended resulting in a wax composition characterized as set in Table 19 below. The triacylglycerol level was above 99%.

TABLE 19

| Iodine Value | 52 |
|---|---|
| Fatty acid composition | |
| C16:0 | 20% |
| C18:0 | 10% |
| C18:1 | 39% |
| C18:2 | 4% |
| C22:0 | 5% |
| C22:1 | 16% |
| Other | 2% |

Example 19 (E19)

350 grams of example 6 and 650 grams of example 14 were blended giving a wax composition characterized as set in Table 20 below. The triacylglycerol level was above 99%.

TABLE 20

| Iodine Value | 67 |
|---|---|
| Fatty acid composition | |
| C16:0 | 4.5% |
| C18:0 | 14% |
| C18:1 | 68% |
| C18:2 | 3% |
| C22:0 | 1.5% |
| C22:1 | 5% |
| Other | 2% |

Example 20 (E20)

60 grams of example 6 and 940 grams of example 16 was blended resulting in a wax composition characterized as set in Table 21 below. The triacylglycerol level was above 97% and 3% of a polyol (STS)

TABLE 21

| Iodine Value | 44 |
|---|---|
| Fatty acid composition | |
| C12:0 | 5% |
| C16:0 | 7% |
| C18:0 | 33% |
| C18:1 | 45% |
| C18:2 | 2% |
| C22:0 | 2% |
| C22:1 | 2% |
| Other | 5% |

Example 21 (E21)

A blend of High erucic rape seed oil (25%) and low erucic rape seed oil (75%) were partially hydrogenated, bleached and deodorized resulting in a wax composition characterized as set in Table 22 below. The triacylglycerol level was above 99%.

TABLE 22

| Iodine Value | 73 |
|---|---|
| Fatty acid composition | |
| C16:0 | 4% |
| C18:0 | 6% |
| C18:1 | 72% |
| C18:2 | 3% |
| C22:0 | 4% |
| C22:1 | 8% |
| Other | 3% |

Example 22 (E22)

A partial hydrogenation of a low erucic rape seed oil followed by bleaching and deodorization resulting in a wax composition characterized as set in Table 23 below. The triacylglycerol level was above 99%.

TABLE 23

| Iodine Value | 83 |
|---|---|
| Fatty acid composition | |
| C16:0 | 5% |
| C18:0 | 2% |
| C18:1 | 88% |
| C18:2 | 4% |
| C22:0 | <0.5% |
| C22:1 | <0.5% |
| Other | 1% |

Example 23 (E23)

490 grams of E21 and 510 grams of E22 were blended resulting in a wax composition characterized as set in Table 24 below. The triacylglycerol level was above 99%.

TABLE 24

| Iodine Value | 77 |
|---|---|
| Fatty acid composition | |
| C16:0 | 5% |
| C18:0 | 3% |
| C18:1 | 82% |
| C18:2 | 2% |
| C22:0 | 2% |
| C22:1 | 4% |
| Other | 2% |

Example 24

The compositions E17-E20 and E23 were melted to 55° C. and kept at 55° C. for 30 minutes. After that, 250 grams of each components were added into glass jars, separately. The filled jars were cooled to room temperature. After two weeks of storage, the samples were evaluated. The result of this evaluation is summarized in the Table 25 below.

TABLE 25

| | E17 | E18 | E19 | E20 | E23 |
|---|---|---|---|---|---|
| Smooth surface | 5 | 5 | 5 | 5 | 5 |
| Cracking surface | 4 | 4.5 | 5 | 4.5 | 4 |
| Frosting | 5 | 5 | 5 | 5 | 5 |

TABLE 25-continued

|  | E17 | E18 | E19 | E20 | E23 |
|---|---|---|---|---|---|
| Cracking on the side | 4 | 5 | 5 | 4.5 | 4 |
| Surface on the bottom | 4 | 5 | 5 | 5 | 4.5 |
| Total | 22 | 24.5 | 25 | 24 | 22.5 |

Those parameters were previously described on Example 11. The acceptable scores 4 and 5 were achieved on all compositions evaluated.

Example 25

The burning of the compositions in examples E1-E5, E9 and E10 were evaluated.
The height of the flame was measured every 15 minutes for four continuous hours of burning.

TABLE 26

| | Flame height (mm) | | | | | | | | Average |
|---|---|---|---|---|---|---|---|---|---|
| Composition | 15 min | 30 min | 45 min | 60 min | 90 min | 120 min | 180 min | 240 min | (mm) |
| E1 | 22 | 22 | 22 | 22 | 22 | 22 | 22 | 22 | 22 |
| E2 | 27 | 27 | 27 | 27 | 27 | 27 | 26 | 26 | 27 |
| E3 | 29 | 29 | 29 | 30 | 29 | 29 | 29 | 29 | 29 |
| E4 | 27 | 27 | 27 | 27 | 28 | 28 | 27 | 27 | 27 |
| E5 | 30 | 30 | 29 | 29 | 29 | 29 | 29 | 30 | 29 |
| E9 | 33 | 31 | 32 | 32 | 32 | 33 | 32 | 32 | 32 |
| E10 | 30 | 31 | 31 | 30 | 30 | 30 | 30 | 30 | 30 |

The numbers represent the height of the flames in millimeters. The wicket used was Wick/TLR 15/50/23-NST 7.
The examples E9 and E10 generated larger clearer flames than the examples E1-E5.
The examples E9 and E10 resulted in stable flames of above 30 mm while E1-E5 all generated flames having an average height below 30 mm.
The jars were weighed before and after 240 minutes of burning, resulting in the amount of burned material, as seen bellow:

TABLE 27

| Composition | Consumed material after 240 min [g] | Average consumption [g/h] |
|---|---|---|
| E1 | 20.16 | 5.04 |
| E2 | 21.94 | 5.49 |
| E3 | 23.73 | 5.93 |
| E4 | 20.26 | 5.07 |
| E5 | 25.11 | 6.28 |
| E9 | 23.31 | 5.83 |
| E10 | 21.8 | 5.45 |

The lowest amount of consumed material after 4 hours of burning was found on composition E1. The composition E5 showed a larger amount of consumed material.
The yield can be defined as the flame height per consumed material per hour. This indicates how much light can one gram of the wax composition produce every hour while burning.

TABLE 28

| Example | Yield [mm/g/h] |
|---|---|
| E1 | 4.4 |
| E2 | 4.9 |

TABLE 28-continued

| Example | Yield [mm/g/h] |
|---|---|
| E3 | 4.9 |
| E4 | 5.4 |
| E5 | 4.7 |
| E9 | 5.5 |
| E10 | 5.6 |

The examples E9 and E10 showed the highest and clearest flames per gram consumed material per hour. The composition E4 also achieved a reasonable yield of above 5, but as the flame height was the second lowest, it does not reach a positive total score.

Example 26: (E26)

5 kg of a high erucic oil were partially hydrogenated, bleached and deodorized. The partially hydrogenated High erucic wax composition was characterized as set in Table 29 below. The triacylglycerol level was above 99%.

TABLE 29

| Melting point ° C. | 60 |
|---|---|
| Iodine Value | 6 |
| Fatty acid composition | |
| C16:0 | 4% |
| C18:0 | 38% |
| C18:1 | 5% |
| C18:2 | <0.5% |
| C22:0 | 43% |
| C22:1 | 3% |
| Other | 8% |

Example 27 (E27)

5 kg of a high erucic oil were partially hydrogenated, bleached and deodorized. The partially hydrogenated High erucic wax composition was characterized as set in Table 30 below. The triacylglycerol level was above 99%.

TABLE 30

| Melting point ° C. | 38 |
|---|---|
| Iodine Value | 64 |
| Fatty acid composition | |
| C16:0 | 4% |
| C18:0 | 8% |
| C18:1 | 34% |

TABLE 30-continued

| | |
|---|---|
| C18:2 | 3% |
| C22:0 | 6% |
| C22:1 | 38% |
| Other | 7% |

Example 28 (E28)

900 grams of E27 and 100 grams of E7 were blended. The wax composition was characterized as set in the Table 31 below. The triacylglycerol level was above 99%.

TABLE 31

| Iodine Value | 67 |
|---|---|
| Fatty acid composition | |
| C16:0 | 4% |
| C18:0 | 12% |
| C18:1 | 31% |
| C18:2 | 3% |
| C22:0 | 10% |
| C22:1 | 34% |
| Other | 6% |

Example 29 (E29)

150 grams of E26 and 850 grams of E8 was blended. The wax composition was characterized as set in the Table 32 below. The triacylglycerol level was above 99%.

TABLE 32

| Iodine Value | 53 |
|---|---|
| Fatty acid composition | |
| C16:0 | 5% |
| C18:0 | 27% |
| C18:1 | 57% |
| C18:2 | 2% |
| C22:0 | 6% |
| C22:1 | 0.5% |
| Other | 3% |

Example 30 (E30)

280 grams of E9 and 720 grams of E5 was blended giving the total wax composition as characterized in the Table 33 below. The triacylglycerol level was above 99%.

TABLE 33

| Iodine Value | 47 |
|---|---|
| Fatty acid composition | |
| C16:0 | 38% |
| C18:0 | 10% |
| C18:1 | 41% |
| C18:2 | 6% |
| C22:0 | 0.8% |
| C22:1 | 1.1% |
| Other | 3% |

Example 31

The compositions E6 and E28-E30 were melted to 55° C. and kept at 55° C. for 30 minutes. 250 grams of each composition were added into glass jars, separately. The filled jars were cooled to room temperature. After two weeks of storage, the samples were evaluated. The result of this evaluation is summarized in the Table 34 below.

TABLE 34

| | E6 | E28 | E29 | E30 |
|---|---|---|---|---|
| Smooth surface | 5 | 4 | 5 | 4.5 |
| Cracking surface | 5 | 5 | 4 | 4.5 |
| Frosting | 5 | 5 | 4 | 4 |
| Cracking on the side | 4.5 | 5 | 4.5 | 5 |
| Surface on the bottom | 5 | 5 | 4 | 4.5 |
| Total | 24.5 | 24 | 21.5 | 22.5 |

Those parameters were previously described on Example 11. The acceptable scores 4 and 5 were achieved on all compositions evaluated.

Example 32 (E32)

A blend of High erucic rape seed oil (25%) and low erucic rape seed oil (75%) were interesterifed followed by partially hydrogenation. The wax was further bleached and deodorized resulting in a wax composition characterized as set in the Table 35 below. The triacylglycerol level was above 98%.

TABLE 35

| Iodine Value | 71 |
|---|---|
| Fatty acid composition | |
| C16:0 | 4% |
| C18:0 | 6% |
| C18:1 | 70% |
| C18:2 | 3% |
| C22:0 | 5% |
| C22:1 | 7% |
| Other | 5% |

Example 33: (E33)

5 kg of a high erucic oil were partially hydrogenated followed by bleaching and deodorization. The partially hydrogenated high erucic oil was interesterified creating a wax composition characterized as set in Table 36 below. The triacylglycerol level was above 98%.

TABLE 36

| Iodine Value | 59 |
|---|---|
| Fatty acid composition | |
| C16:0 | 4% |
| C18:0 | 10% |
| C18:1 | 31% |
| C18:2 | 3% |
| C22:0 | 15% |
| C22:1 | 31% |
| Other | 10% |

Example 34 (E34)

940 grams of Example 15, 30 grams of sorbitan tristearate (STS, CAS 26658-19-5) and 30 grams of a monoglyceride (CAS 31566-31-1) were blended, giving the total wax composition as characterized in the Table 37 below. The triacylglycerol level was above 94%. Both glyceryl monostearate and STS are polyol esters.

TABLE 37

| Iodine Value | 41 |
|---|---|
| Fatty acid composition | |
| C12:0 | 5% |
| C16:0 | 7% |
| C18:0 | 36% |
| C18:1 | 45% |
| C18:2 | 2% |
| C22:0 | <0.5% |
| C22:1 | <0.5% |
| Other | 5% |

Example 35: (E35)

750 grams of example 9 and 250 grams of a commercial paraffin wax, named Paraffin wax SW 5803, were melted at 80° C. and blended creating a wax composition with the fatty acid composition characterized as set in the Table 38 below. The triacylglycerol level was 75%.

TABLE 38

| Melting point ° C. | 45 |
|---|---|
| Iodine Value | 59 |
| Fatty acid composition | |
| C16:0 | 4% |
| C18:0 | 24% |
| C18:1 | 63% |
| C18:2 | 2% |
| C22:0 | 3% |
| C22:1 | 4% |
| Other | 3% |

Example 36 (E36)

960 grams of Example 19 and 40 grams of a monoglyceride (CAS 31566-31-1) was blended giving the total wax composition as characterized in Table 39. The triglyceride level was above 95%. Glyceryl monostearate is a polyol ester.

TABLE 39

| Iodine Value | 67 |
|---|---|
| Fatty acid composition | |
| C16:0 | 4.5% |
| C18:0 | 14% |
| C18:1 | 68% |
| C18:2 | 3% |
| C22:0 | 1.5% |
| C22:1 | 5% |
| Other | 2% |

Example 37 (E37)

200 gram of the blend in example 19 and 36 respectively were melted completely and poured in a see through glass jar. The pull away from the glass was studied, see Table 40. The addition of the monoglyceride improved the pull away further.

TABLE 40

| 4 and 5 are acceptable results | | |
|---|---|---|
| | E 19 | E37 |
| Smooth surface | 5 | 5 |
| Cracking surface | 5 | 5 |
| Frosting | 5 | 5 |
| Cracking on the side | 5 | 5 |
| Surface on the bottom | 5 | 5 |
| Pull away | 4 | 5 |
| | 29 | 30 |

The invention claimed is:

1. A wax composition, comprising at least 70 wt. % triacylglycerols based on the total weight of the composition, wherein the triacylglycerols comprise 0.5 to 50 wt. % of C22 fatty acid based on the total weight of the triacylglycerols and 0.5 to 100 wt. % of partially hydrogenated high erucic rapeseed oil.

2. The wax composition according to claim 1, wherein the wax composition comprises at least 90 wt. % of triacylglycerols based on the total weight of the composition, and
   wherein the triacylglycerols comprise 0.5 to 49 wt. % of partially hydrogenated high erucic rapeseed oil and 0.5 to 26 wt. % of C22 fatty acid based on the total weight of the triacylglycerols.

3. The wax composition according to claim 1, wherein the triacylglycerols comprise up to 20 wt. % of C22:0 fatty acid and 0.5 to 25 wt. % of C22:1 fatty acid.

4. The wax composition according to claim 1, wherein the triacylglycerols comprise 2 to 29 wt. % of partially hydrogenated high erucic rapeseed oil and 1 to 15 wt. % of C22 fatty acid.

5. The wax composition according to claim 1, wherein the triacylglycerols comprise up to 8 wt. % of C22:0 fatty acid and 1 to 15 wt. % of C22:1 fatty acid.

6. The wax composition according to claim 1, wherein the wax composition has a melting point of 35° C. to 52° C.

7. The wax composition according to claim 1, wherein the partially hydrogenated high erucic rapeseed oil has an iodine value of 4 to 75.

8. The wax composition according to claim 1, further comprising at least a one oil selected from the group consisting of soybean oil, palm oil, coconut oil, and rapeseed oil.

9. The wax composition according to claim 8, wherein the at least one oil is partially hydrogenated before blending.

10. The wax composition according to claim 1, wherein the wax composition further comprises at least one polyol-based material, selected from the group consisting of a sorbitan tristearate, monoacylglycerol, sorbitan monostearate, polyglycerol stearate, propyleneglycol stearate and polyglycerol polyricinolates or combinations thereof.

11. The wax composition according to claim 1, wherein the wax composition further comprises a paraffin.

12. The wax composition according to claim 1, wherein the partially hydrogenated high erucic rapeseed oil is blended to a fully hydrogenated high erucic rapeseed oil to a final concentration of 1-100 wt. %.

13. A method of preparing a wax composition comprising the steps of:
   a) providing a triacylglycerol comprising 0.5 to 50 wt. % of C22 fatty acid;
   b) mixing the triacylglycerol with 0.5 to 100 wt. % of partially hydrogenated high erucic rapeseed oil; and
   c) obtaining the wax composition.

14. The method according to claim 13, further comprising adding at least one polyol-based material, selected from the group consisting of sorbitan tristearate, monoacylglycerol, sorbitan monostearate, polyglycerol stearate, propyleneglycol stearate and polyglycerol polyricinolates or combinations thereof.

15. The method according to claim 14, further comprising a step of mixing paraffin to the wax composition.

16. A candle comprising a wax composition according to claim 1.

17. The candle according to claim 16, prepared by a method of preparing a wax composition comprising the steps of:
   a) providing a triacylglycerol comprising 0.5 to 50 wt. % of C22 fatty acid;
   b) mixing the triacylglycerol with 0.5 to 100 wt. % of partially hydrogenated high erucic rapeseed oil; and
   c) obtaining the wax composition.

\* \* \* \* \*